(12) United States Patent
Kim et al.

(10) Patent No.: US 8,043,756 B2
(45) Date of Patent: Oct. 25, 2011

(54) ELECTRONIC APPARATUS HAVING FUEL CELL

(75) Inventors: Sung Han Kim, Kyungki-do (KR); Jae Hyuk Jang, Kyungki-do (KR); Jae Hyoung Gil, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1106 days.

(21) Appl. No.: 11/581,389

(22) Filed: Oct. 17, 2006

(65) Prior Publication Data
US 2007/0087243 A1    Apr. 19, 2007

(30) Foreign Application Priority Data
Oct. 17, 2005    (KR) .......................... 10-2005-0097602

(51) Int. Cl.
*H01M 8/06* (2006.01)
*H01M 8/04* (2006.01)

(52) U.S. Cl. ........ 429/436; 429/408; 429/433; 429/434; 429/439

(58) Field of Classification Search .............. 429/12–46, 429/400–535
See application file for complete search history.

(56) References Cited

U.S. PATENT DOCUMENTS

| | | | |
|---|---|---|---|
| 6,238,815 B1 * | 5/2001 | Skala et al. ..................... | 429/17 |
| 7,122,260 B2 * | 10/2006 | Chang et al. .................. | 429/436 |
| 7,235,316 B2 * | 6/2007 | Acker ........................... | 429/436 |
| 7,276,096 B2 * | 10/2007 | Kaye et al. ................... | 48/198.1 |
| 2004/0028961 A1 * | 2/2004 | Acker ............................ | 429/13 |
| 2004/0224194 A1 * | 11/2004 | Acker ............................ | 429/13 |
| 2005/0008909 A1 * | 1/2005 | Kaye et al. ..................... | 429/20 |
| 2005/0100769 A1 * | 5/2005 | Acker ............................ | 429/24 |
| 2006/0246339 A1 * | 11/2006 | Norimatsu et al. ............. | 429/35 |

FOREIGN PATENT DOCUMENTS

| | | |
|---|---|---|
| JP | 55-63490 | 10/1978 |
| JP | 1-165394 | 11/1989 |
| JP | 5-141583 | 6/1993 |
| JP | 2000-260445 | 9/2000 |
| JP | 2001-259068 | 9/2001 |
| JP | 2002-169625 | 6/2002 |
| JP | 2004-303536 | 10/2004 |

OTHER PUBLICATIONS

Japanese Office Action dated Jun. 15, 2010, issued in corresponding Japanese Patent Application No. 2006-281378.

* cited by examiner

*Primary Examiner* — Melvin Mayes
*Assistant Examiner* — Kevin Johnson (57) ABSTRACT

An electronic apparatus having a fuel cell which sufficiently supplies air to the fuel cell without a separate air pump or fan. In the electronic apparatus, a cooling fan cools heat-generating parts of an external device having the fuel cell mounted thereon. A guide bracket guides wind of the cooling fan, upon having cooled the heat-generating parts, toward a fuel cell.

12 Claims, 9 Drawing Sheets

PRIOR ART

ELECTRONIC APPARATUS HAVING FUEL CELL

CLAIM OF PRIORITY

This application claims the benefit of Korean Patent Application No. 2005-97602 filed on Oct. 17, 2005 in the Korean Intellectual Property Office, the disclosure of which is incorporated herein by reference.

BACKGROUND OF THE INVENTION

1. Field of the Invention

The present invention relates to an electronic apparatus having a fuel cell which generates current through chemical reaction. More particularly, the present invention relates to an electronic apparatus capable of sufficiently supplying air to a fuel cell without a separate air pump or fan.

2. Description of the Related Art

Recently, a portable fuel cell has been developed as a compact portable electric power. This portable fuel cell is superior to a portable electrical power supply which drives a generator and generates electricity via engines. That is, compared with the portable electrical power supply, such a portable fuel cell generates electricity equal to hundreds of watts, exhausts less air pollutants and causes less noises.

In general, the portable fuel cell has a fuel cell body in which phosphoric acid fuel cells are stacked. Also, an air supply fan or a metal hydride tank is housed in a casing. Here the air supply fan supplies air to a fuel cell body and the metal hydride tank supplies hydrogen as a fuel gas. During operation, the portable fuel cell generates electricity using air transported by the air supply fan and hydrogen supplied from a hydrogen supply source.

Conventionally, the portable fuel cell is designed to be operable with the construction which is as simple as possible. Here, the portable fuel cell cools a fuel cell body with air transported from the air supply fan to the fuel cell body. Also, high-temperature air exhausted from the fuel cell body is used to raise temperature of the metal hydride tank.

To release unreacted fuel cell gas out of the fuel cell body, the portable fuel cell is typically equipped with a catalystic combustor for processing unreacted hydrogen. The catalystic combustor includes a catalyst layer having for example a platinum catalyst, where catalystic combustion is performed using a mixture of the unreacted hydrogen and air.

The fuel cell generates current smoothly when sufficiently supplied with air including oxygen. But this natural convection method disadvantageously fails to ensure sufficient air supply to the fuel cell. To overcome this drawback, air is forcibly supplied to between the stacked cells using a separate fan.

The conventional fuel cell will be explained in greater detail hereunder with reference to FIG. 1.

Figure 1:
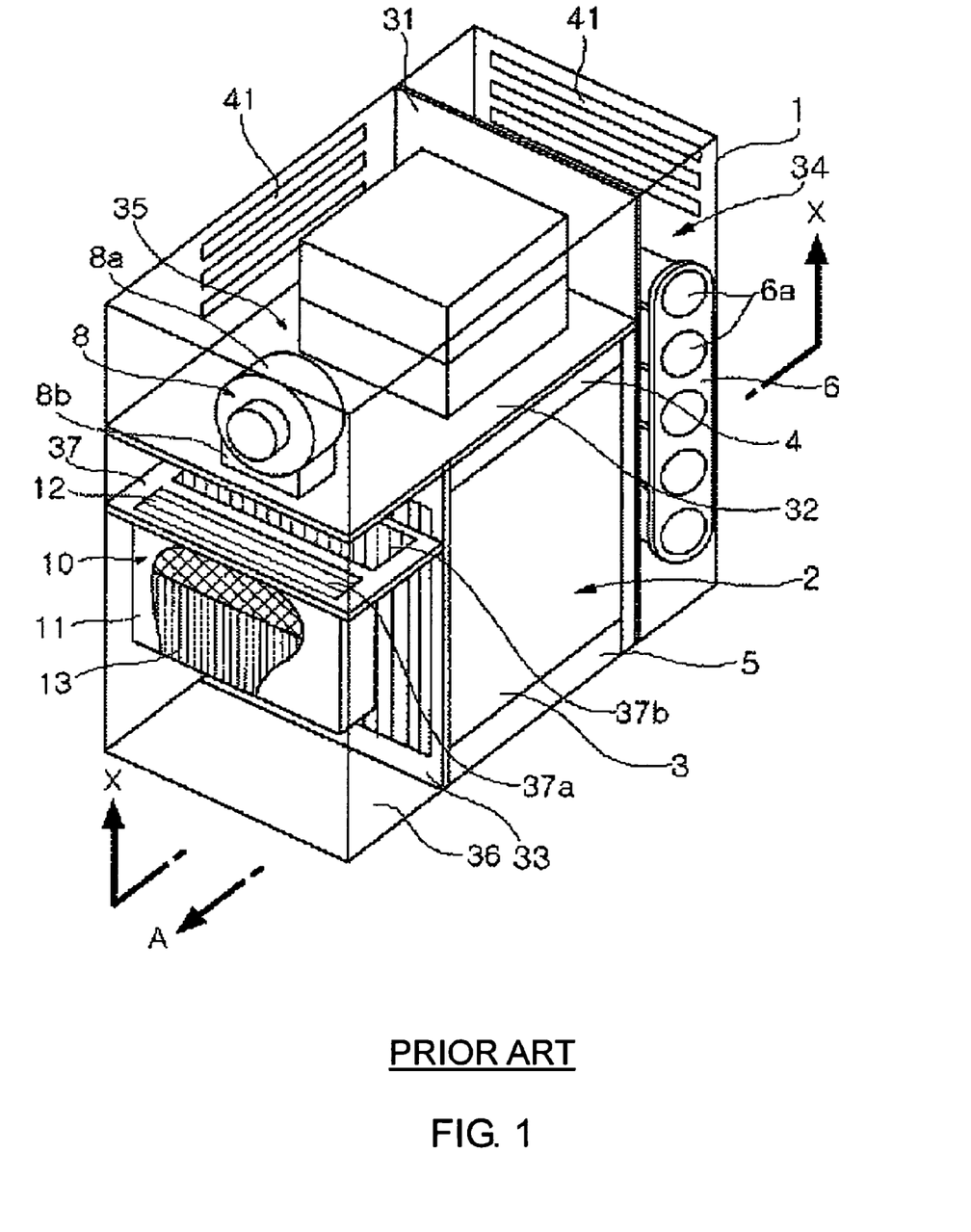
FIG. 1 is a perspective view illustrating a conventional fuel cell.

FIG. 1 is a perspective view illustrating the conventional fuel. For explanatory purpose, in FIG. 1, a narrow A indicates a forward direction, and a direction perpendicular to the arrow A is referred to as a horizontal direction.

As shown in FIG. 1, the conventional fuel cell includes a phosphoric acid fuel cell body 2, a metal hydride tank 6, an air supply fan 8, a catalystic combustor 10, a DC-DC converter and a controller. The phosphoric acid fuel cell body 2 is housed in a casing 1 and supplied with hydrogen and air to generate electricity. The metal hydride tank 6 supplies hydrogen stored to the fuel cell body 2. The air supply fan 8 supplies air to the fuel cell body 2. Also, the catalystic combustor 10 processes unreacted hydrogen discharged from the fuel cell body 2. The DC-DC converter controls voltage of power supplied to the outside at a uniform level. A controller (not shown) controls operation of each unit.

To form a fuel stack 3, a predetermined number (e.g., 30 plates) of rectangle-shaped phosphoric acid power-generating cells are stacked horizontally via a bipolar plate. Here, the plates of the stack are fastened at both ends individually. In the fuel cell body 2, hydrogen gas supplied to a distribution manifold 4 travels downward inside the fuel stack 3 and then into the power-generating cells. In turn, unreacted hydrogen travels back to a recovery manifold 5. Meanwhile, air supplied onto the fuel stack 3 travels downward inside the fuel stack 3 and into the power-generating cells. At the same time, the fuel cell body 2 is air-cooled and high-temperature air is released to a rear side of the fuel cell stack 3.

The casing 1 has partitions 31, 32 and 33 formed on rear, upper and front sides of the fuel cell 2. The casing 1 is divided into front and rear sides by the partition 31, and a rear space 34 is formed behind the partition 31. Also, a front space of the partition 31 is divided into upper and lower sides by the partition 32. An upper space 35 is formed in an upper part of the partition 32. Furthermore, a lower space of the partition 32 is divided into front and rear sides by the partition 33 and a front space 36 is formed in front of the partition 33. In addition, the partitions 31 and 33 each have an opening for circulating air disposed corresponding to the fuel stack 3.

The metal hydride tank 6 is connected to a plurality of metal hydride tank elements 6a filled with metal hydride. The metal hydride tank 6 is mountable in the rear space 34. Also, the metal hydride tank 6 and the distribution manifold 4 are connected to a hydrogen introduction pipe (not illustrated) and hydrogen is supplied to the distribution manifold 4.

The air supply fan 8 has an intake hole 8a formed in a central part thereof and a ventilator 8b formed in a lower part thereof. The air supply fan 8 is disposed in an upper part of the front space 36 in the upper space 35. A catalystic combustor 10 includes a rectangular parallelepiped external plate 11, a bar-shaped hydrogen supply nozzle, and a catalyst layer 13. The external plate 11 has upper and lower sides wide opened. The hydrogen supply nozzle 12 is inserted into an upper space of the external plate 11. The catalyst layer 13 is filled in a lower space inside the external plate 11. The catalystic combustor 10 is fixed in a front portion of the front space 36, in particular to a support plate 37 installed under the partition 32 inside the front space 36.

Furthermore, the support plate 37 has openings 37a and 37b formed therein so that air from above is distributed to middle and external sides of the catalystic combustor 10 at an adequate ratio and travels downward. Also, the hydrogen introduction pipe is provided between the recovery manifold 5 and the hydrogen supply nozzle 12 to induce unreacted hydrogen. The catalyst layer 13 has a platinum catalyst formed on a honeycomb which causes catalytic combustion to a mixture of the unreacted hydrogen and air passing therethrough.

In this catalystic combustor 10, the unreacted hydrogen from the recovery manifold 5 is subject to catalystic combustion using air received from thereabove. Then, high temperature combustion gas is released from an underside of the catalystic combustor 10. The DC-DC converter and controller are superimposed one upon another in the upper space 35. In addition, air intake holes 41 are formed according to locations of the DC-DC converter and controller. A driving heater (not illustrated) is provided to heat air transported to the fuel cell body through the air intake holes 41.

This conventional fuel cell is necessarily equipped with the air supply fan 8 for supplying air to the fuel stack 3 and the driving heater for heating the air supplied. This complicates internal construction of the fuel cell and subsequently a manufacturing process thereof, thereby increasing manufacturing costs and hampering miniaturization thereof.

Moreover, the air supply fan 8 and the driving heater run with a lot of noise, rendering their use inconvenient. Further, disadvantageously, additional power is required to operate the air supply fan 8 and the driving heater. Especially, the fuel cell, when employed in a note book computer requires a cooling fan for cooling and the air supply fan 8 independently, thereby disadvantageously aggravating noises.

Also, to generate current, the fuel cell performs chemical reaction most actively when air supplied has a temperature of 60° C. to 70° C. Thus in a case where low-temperature air is supplied to the fuel cell due to low ambient temperature, the fuel cell experiences considerable decline in its capability.

SUMMARY OF THE INVENTION

The present invention has been made to solve the foregoing problems of the prior art and it is therefore an object according to certain embodiments of the present invention is to provide an electronic apparatus which sufficiently supplies air to a fuel cell without a separate air pump or fan, and supplies hot air to the fuel cell, thereby achieving a less noise-making and compact product improved in capability of the fuel cell.

According to an aspect of the invention for realizing the object, there is provided an electronic apparatus having a fuel cell including: a cooling fan for cooling heat-generating parts; and a guide bracket for guiding wind of the cooling fan, upon having cooled the heat-generating parts, toward a fuel cell.

The guide bracket includes a first guide bracket having an exhaust hole, the first guide bracket guiding the wind of the cooling fan, upon having cooled the heat-generating parts, to be exhausted toward the exhaust hole; and a second guide bracket having an intake hole, the second guide bracket receiving the wind exhausted from the exhaust hole through the intake hole to guide toward the fuel cell.

The electronic apparatus further includes a body housing for housing the cooling fan and the first guide bracket therein, the body housing having a first through hole disposed in a portion of the body housing corresponding to the exhaust hole of the first guide bracket which exhausts the wind of the cooling fan; and a fuel cell housing for housing the fuel cell and the second guide bracket therein, the fuel cell housing having a second through hole disposed in a portion of the fuel cell housing corresponding to the intake hole which takes in the wind exhausted from the exhaust hole.

The body housing and the fuel cell housing are detachably combined.

Here, the second guide bracket is combined such that the intake hole is protruded outside to be inserted into the body housing through the first through hole.

The body housing further includes a blocking plate for opening and closing the first through hole.

The blocking plate is hinged inside the body housing.

Here, preferably, the first through hole further includes elastic means for applying an elastic force to the first through hole so that the blocking plate covers the first through hole.

The first through hole may be formed at a side portion of the body housing. Alternatively, the first through hole may be formed at an underside surface of the body housing.

Moreover, the body housing and the fuel housing are structured to be coupled with and detached from each other such that the exhaust hole and the intake hole can contact and be separated from each other.

The body housing has at least one air outlet formed therein so that air exhausted from the first guide bracket is released outside, and wherein the blocking plate blocks the air outlet when the first through hole is open.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 2:
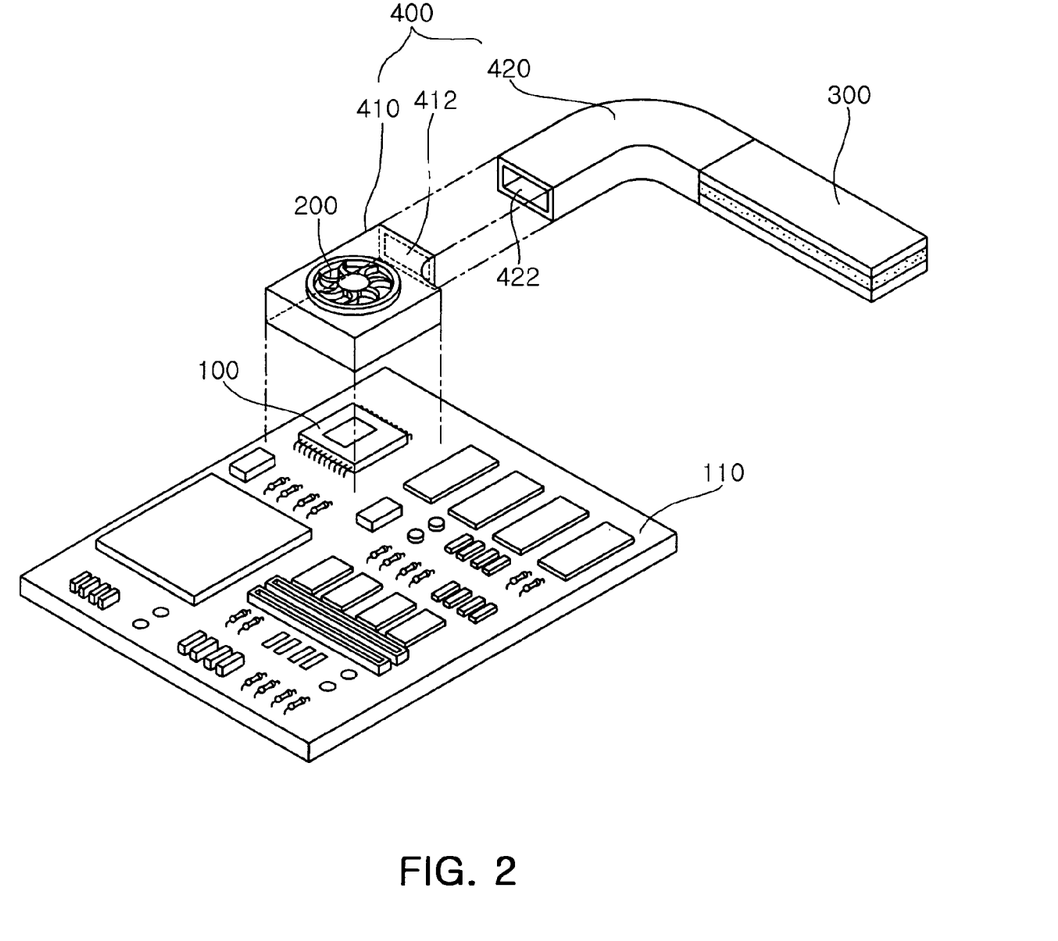
FIG. 2 is a perspective view illustrating internal construction of an electronic apparatus according to the invention.

FIG. 2 is a perspective view illustrating internal construction of an electronic apparatus according to an embodiment of the invention.

The electronic apparatus of FIG. 2 is applicable to a note book computer. The electronic apparatus includes a cooling fan 200, a fuel cell 300 and a guide bracket 400. The cooling fan 200 serves to cool a central processing unit (CPU) mounted on a main board 110. The fuel cell 300 supplies power to each unit of the note book computer. The guide bracket 400 guides wind generated by the cooling fan 200, upon having cooled the CPU, toward the fuel cell 300.

The guide bracket 400 includes a first guide bracket 410 and a second guide bracket 410. The first guide bracket 410 guides the wind from the cooling fan 200, upon having cooled the CPU 100, to be exhausted toward a side. The second guide bracket 420 receives the wind exhausted from the first guide bracket 410 to guide toward the fuel cell 300. The first guide bracket 410 is attached onto the main board 110 to cover the CPU 100. The first guide bracket 410 has an exhaust hole 412 at one side portion, through which the wind from the cooling fan 200 is exhausted to the outside of the first guide bracket 412. Also, the second guide bracket 420 has an intake hole 422 formed to fit closely with the exhaust hole 412 when connected with the first guide bracket 410.

The cooling fan 200 for cooling the CPU 100 takes in air from around the first guide bracket 410, i.e., air from above the first guide bracket 410 so that the air flows into the first guide bracket 410 and then exhausts out of the first guide bracket 410 via the exhaust hole 412. Here, if the cooling fan 200 spins in an opposite direction, i.e., to exhaust air above the guide bracket 410, the first guide bracket 410 may be modified in its structure such that the first guide bracket is opened in its side and the wind exhausted toward the upper side of the cooling fan 200 is redirected to the second guide bracket 420.

Also, the first guide bracket 410 and the second guide bracket 420 are curved to pass the wind from the cooling fan 200 therethrough more smoothly.

Figure 3:
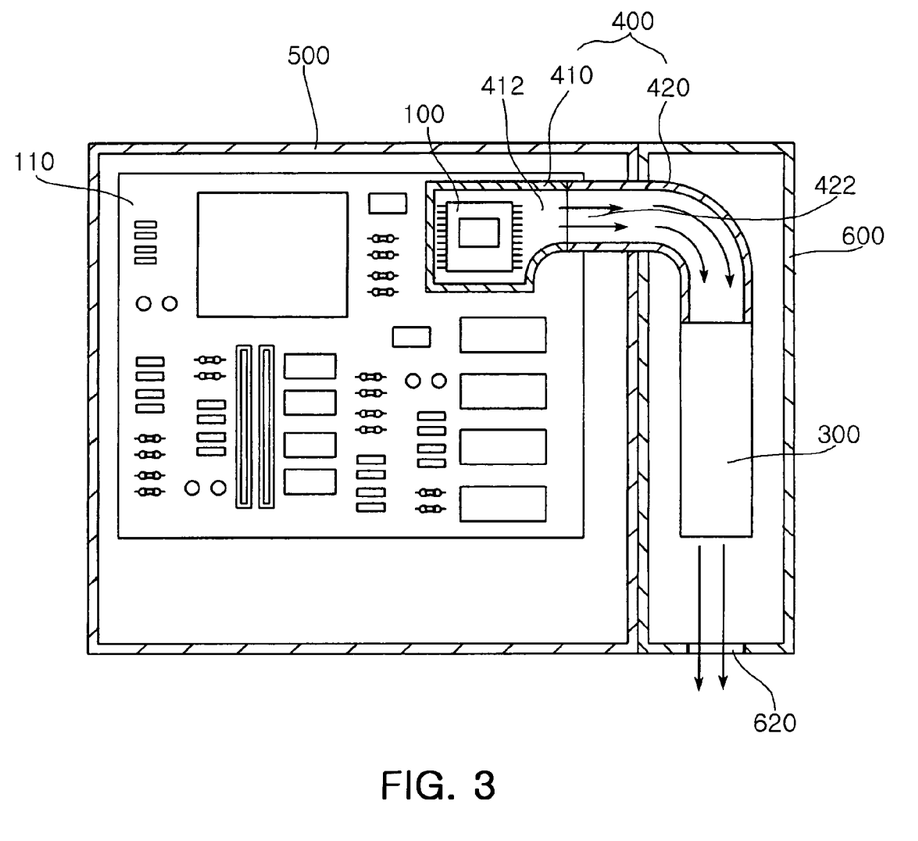
FIG. 3 is a horizontal cross-sectional view illustrating an electronic apparatus according to the invention.

FIG. 3 is a horizontal cross-sectional view illustrating an electronic apparatus according to the invention.

As shown in FIG. 3, the electronic apparatus of the invention further includes a body housing 500 for housing the cooling fan 200 and the first guide bracket 410 therein and a fuel cell housing 600 for housing the fuel cell 300 and the second guide bracket 420 therein. The second guide bracket 420 is structured such that an end of an intake hole 422 is protruded out of the fuel cell housing 600. When the body housing 500 and the fuel cell housing 600 are combined, the intake hole 422 of the second guide bracket 420 is extended through the body housing 500 with the end fitting closely with the exhaust hole 412.

With the cooling fan 200 spinning, external air of the first guide bracket 410 enters inside the first guide bracket 410 to cool a CPU 100. Then the air is exhausted outside the first guide bracket 410 through the exhaust hole 412. Here, the first guide bracket 410 and the second guide bracket 420 are combined such that the exhaust hole 412 and the intake hole 422 fit closely with each other. Thus, air exhausted outside the first guide bracket 410 enters inside the second guide bracket 420 through the intake hole 422, passes the fuel cell 300 and exits outward through a vent hole 620. In this fashion, the electronic apparatus of the invention forcibly supplies air to the fuel cell 300 so that the fuel cell 300 is sufficiently supplied with oxygen necessary for chemical reaction for generating current. Here, the air exhausted outside the first guide bracket 410 is heated during cooling of the CPU 100, and then delivered to the fuel cell 300. This more activates chemical reaction that occurs in the fuel cell 300, accordingly further enhancing capability of the fuel cell.

Also, the electronic apparatus of the invention supplies air to the fuel cell 300 without a separate air pump or ventilator, thereby leading to simpler internal configuration of the product. This accordingly simplifies a manufacturing process and ensures compactness due to decline in the number of parts. In addition, the invention prevents noises that arise from the air pump or ventilator.

In this embodiment, the body housing 500 and the fuel cell housing 600 are detachably structured. This allows easier replacement of the fuel cell 300 which has been discharged or outlived its usefulness. The guide bracket is divided into the first and second guide brackets 410 and 420. Here, the body housing 500 and the fuel cell housing 600 are attachable by separate means such as coupling clips or coupling knuckles. Alternatively, the body housing 500 and the fuel cell may be forcibly attached by interference fit without employing separate means. These housings 500 and 600 are combined in a manner equal to the conventional structure and thus will not be explained in further detail.

Moreover, the body housing 500 and the fuel cell housing 600 of the electronic apparatus of the invention may be formed integrally. Preferably, at this time, the guide bracket is fixedly attached between the cooling fan 200 and the fuel cell 300.

Figure 4:
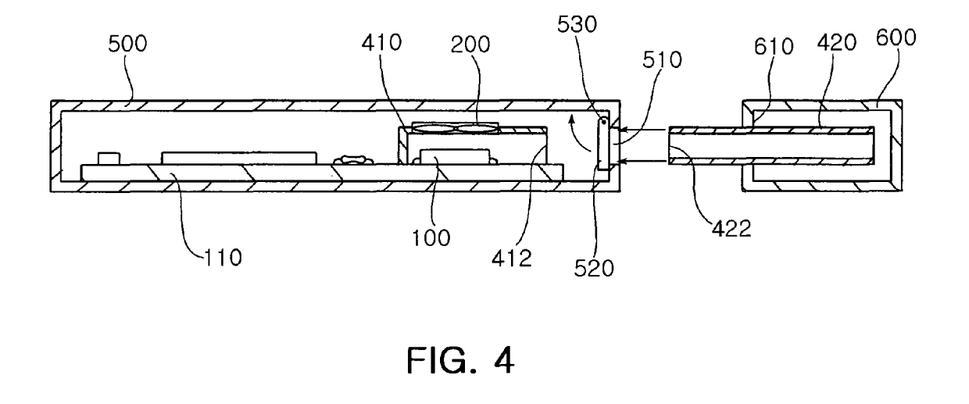
FIG. 4 is a vertical cross-sectional view illustrating an electronic apparatus where a body housing is separated from a fuel cell housing according to a first embodiment of the invention.
Figure 5:
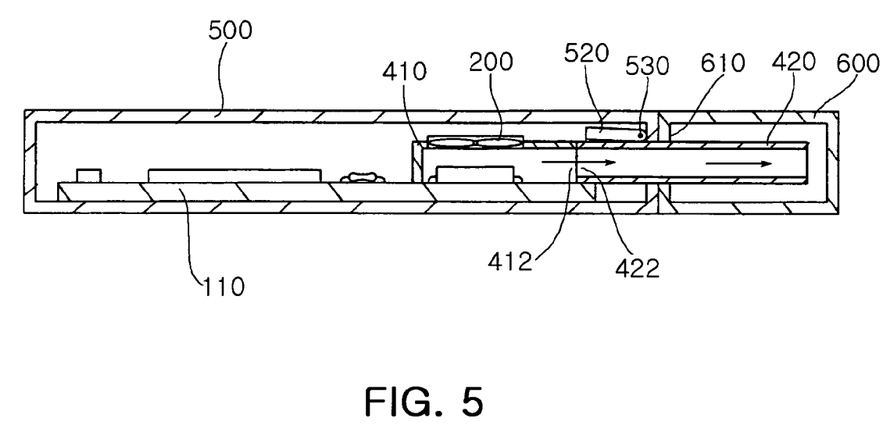
FIG. 5 is a vertical cross-sectional view illustrating an electronic apparatus where a body housing is combined with a fuel cell housing according to a first embodiment of the invention.

FIG. 4 is a vertical cross-sectional view illustrating an electronic apparatus where the body housing 500 is separated from the fuel cell housing 600 according to the invention. FIG. 5 is a vertical cross-sectional view illustrating the electronic apparatus where the body housing 500 is combined with the fuel cell housing 600 according to the invention.

As shown in FIG. 4, the fuel cell housing 600 has a second through hole bracket 610 formed therein so that an end of an intake hole 422 of a second guide bracket 420 is protruded outward. The body housing 500 has a first through hole 510 formed at one side thereof so that another end of the intake hole 422 of the second guide bracket 420 is inserted thereinto. Here in a case where the first through hole 510 is constantly open, dusts or other impurities may enter the body housing 500 when the fuel cell housing 600 is separated from the body housing 500. Thus, the body housing 500 of the invention further includes a blocking plate 520 for opening and closing the first through hole 510.

The blocking plate 520 is arranged rotatable about a hinge 530 to cover an inner side of the first through hole 510. Consequently, when the fuel cell housing 600 and the body housing 500 are combined, as shown in FIG. 5, the blocking plate 520 is pushed by an end of the intake hole 422 of the second guide bracket 420 inserted into the body housing 500 to rotate with respect to the hinge 530, thereby opening the first through hole 510.

The blocking plate 520 of the invention is slidably disposed to open and close the first through hole 510. Alternatively, the blocking plate 520 covers and thus closes the first through hole 510. However, as shown in FIGS. 4 and 5, when the blocking plate 520 is rotatably hinged 530 to close the first through hole 510, the body housing 500 and the fuel cell housing 600 can be combined without any additional effort to open the first through hole 510, thereby ensuring more convenient use. Here, in a case where the second guide bracket 420 is fully drawn out of the body housing 500, the body housing 500 may further include elastic means (not illustrated) for applying an elastic force to the blocking plate 520. This allows the blocking plate 520 to close the first through hole 510 more securely, i.e., the blocking plate 520 to fit closely with the first through hole 510. The elastic means for applying an elastic force to the blocking plate 520 adopts various springs and elastic materials.

Also, in this embodiment, a portion of the intake hole 422 of the second guide bracket 420 is inserted into the body housing 500. Alternatively, a portion of the exhaust hole 412 of the first guide bracket 410 is protruded outside the body housing 500 and the intake hole 422 of the second guide bracket 420 is inserted into the fuel cell housing 60. That is, a portion of the exhaust hole of the first guide bracket 410 is inserted into the fuel cell housing 600 to fit closely with the intake hole 422 of the second guide bracket 420. Of course, in this case, the blocking plate 520 should be disposed inside the fuel cell housing 600 to open and close the second through hole 610.

Figure 6:
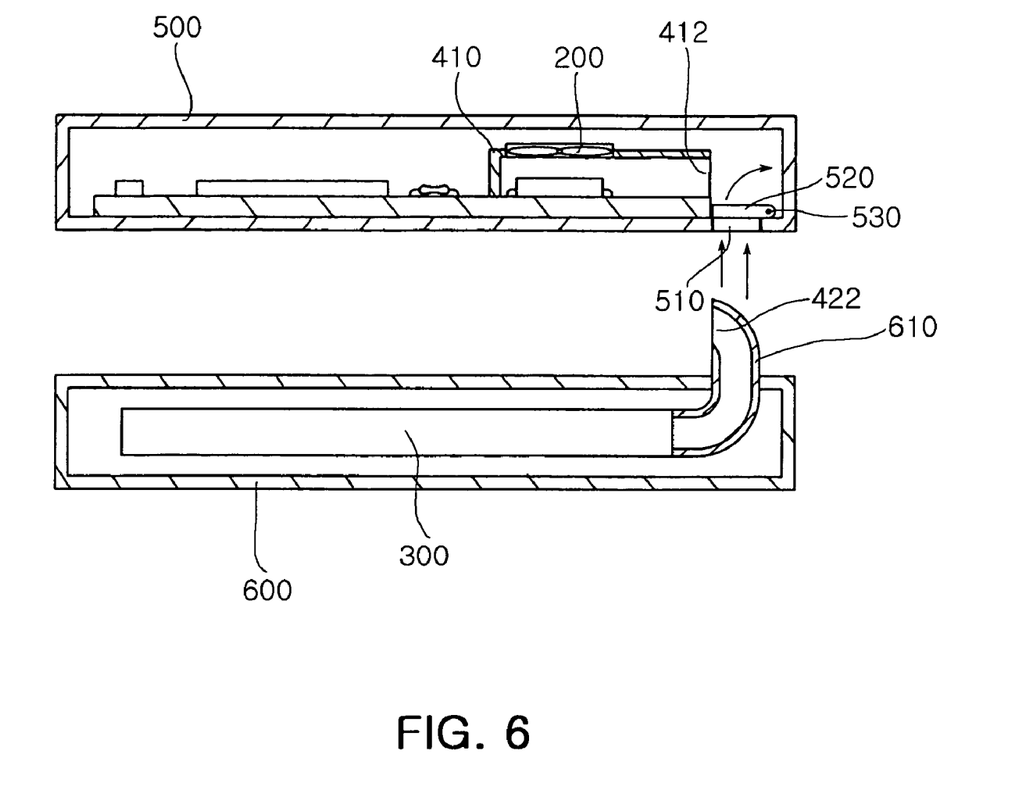
FIG. 6 is a vertical cross-sectional view illustrating an electronic apparatus where a body housing is separated from a fuel cell housing according to a second embodiment of the invention.
Figure 7:
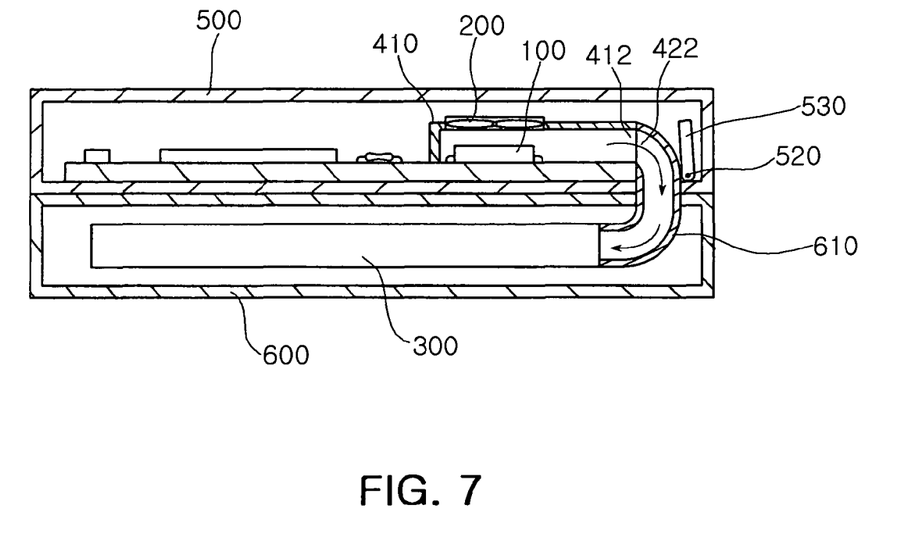
FIG. 7 is a vertical cross-sectional view illustrating an electronic apparatus where a body housing is combined with a fuel cell housing according to a second embodiment of the invention.

FIG. 6 is a vertical cross-sectional view illustrating an electronic apparatus where a body housing is separated from a fuel cell housing according to a second embodiment of the invention. FIG. 7 is a vertical cross-sectional view illustrating an electronic apparatus where a body housing is combined with a fuel cell housing according to a second embodiment of the invention.

As shown in FIGS. 6 and 7, the fuel cell housing 600 is attached to a back side of the body housing 500.

Here, an end of an intake hole 422 of a second guide bracket 420 necessarily fits closely with an end of an exhaust hole 412 of a first guide bracket 410. Thus, a first through hole 510 is formed in a bottom portion of the body housing 500 and a second through hole 610 is formed in a top portion of the fuel cell housing 600. According to this embodiment, a blocking plate 520 for opening and closing the first through hole 510 is attached at a different location but has the same construction and operation when compared with the embodiments of FIGS. 4 and 5. Therefore a detailed explanation thereof will not be given further.

As described above, the fuel cell housing 600 attached to the back side of the body housing 500 diminishes an overall size of the product and increases size of the fuel cell housing 600, thereby leading to use of a bigger fuel cell 300. Also, this increases a contact area between the fuel cell housing 600 and the body housing 500, thereby advantageously ensuring the fuel cell housing 600 and the body housing 500 to be attached more securely.

Figure 8:
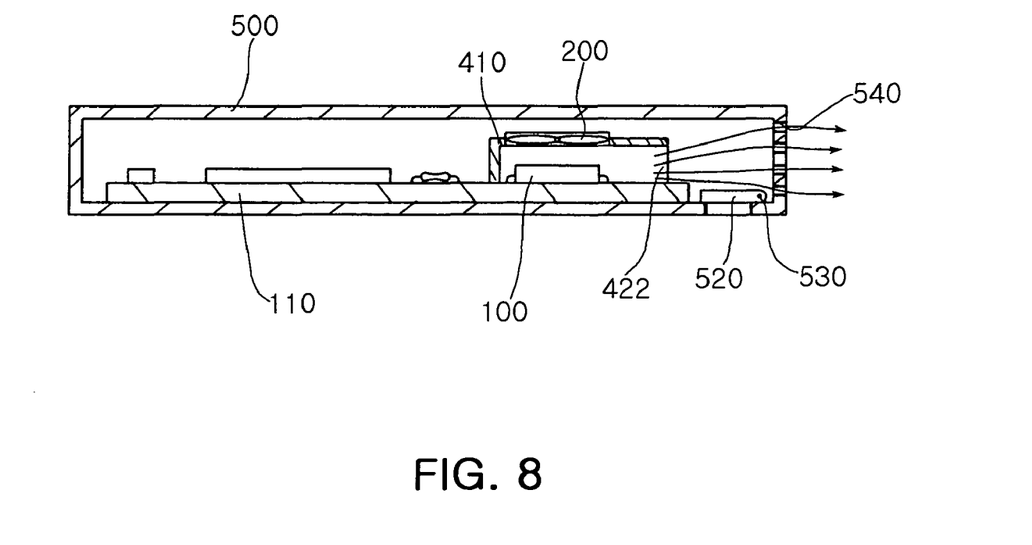
FIG. 8 is a vertical cross-sectional view illustrating an electronic apparatus according to a third embodiment of the invention.
Figure 9:
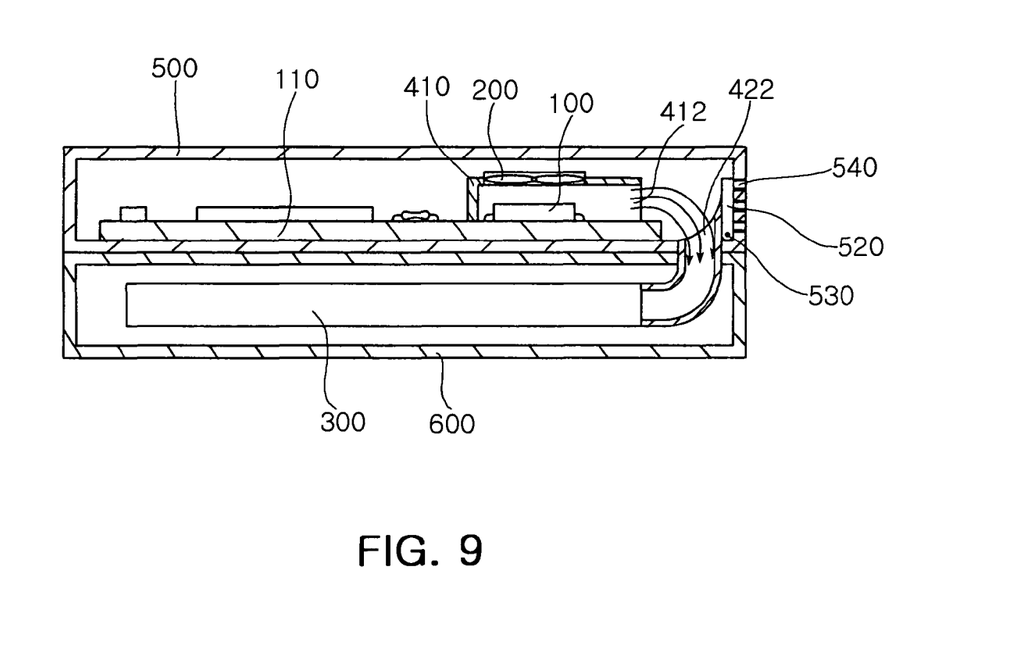
FIG. 9 is a vertical cross-sectional view illustrating an electronic apparatus where a body housing is combined with a fuel cell housing according to a third embodiment of the invention.

FIG. 8 is a vertical cross-sectional view illustrating an electronic apparatus according to a third embodiment of the invention. FIG. 9 is a vertical cross-sectional view illustrating an electronic apparatus where a body housing is combined with a fuel cell housing according to a third embodiment of the invention.

Typically, a notebook computer runs with current applied from battery. But when the battery is discharged, as shown in FIG. 8, the battery is removed and the notebook computer runs with current applied from separate current supply means such as adaptors.

As shown in FIG. 8, when the fuel cell housing 600 is separated from the body housing 500, a first through hole 510 is blocked by a blocking plate 520. Here, the through hole 510 acts as a ventilator of hot air which is generated during operation of a cooling fan 200. Thus, the body housing 500 has a plurality of air outlets 540 on a side thereof so that with the fuel cell housing 600 separated, a hot air generated by a cooling fan 200 exits outside the body housing 500. Therefore, with the fuel cell housing 600 separated and the first through hole 510 closed, hot air heated during cooling of a CPU 100 may exit outside the body housing 500, thereby preventing the body housing 500 from being overheated inside.

Furthermore, as shown in FIG. 9, when the fuel cell housing 600 is combined with the body housing 500, the blocking plate 520 is pushed by an end of the second guide bracket 420 inserted into the body housing 500 to rotate to an opened position so that air circulating via the cooling fan 200 is transported to the fuel cell 300 through the second guide bracket 420. Here, when the air outlets 540 are open, a portion of air circulating via the cooling fan 200 is released out of the body housing 500 through the air outlets 540. This accordingly degrades efficiency in air transport to the fuel cell 300.

Therefore, preferably, the blocking plate 520, as shown in FIG. 9, blocks the air outlets 540 when pushed by an end of the second guide bracket 420 inserted into the body housing 500 to rotate.

Moreover, as described above, if the air outlets 540 are blocked by the blocking plate 520, air exhausted from the exhaust hole 412 enters an intake hole 422 even though the intake hole 422 does not fit closely with the exhaust hole 412. Accordingly, the intake hole 422 and the exhaust hole 412 do not necessarily fit closely with each other.

In the embodiment, an electronic apparatus is applicable to a note book computer. But the electronic apparatus of the invention may adopt various electric and electronic products having fuel cells, which may be varied in their sizes and shapes.

As set forth above, according to preferred embodiments of the invention, an electronic apparatus sufficiently supplies air to a fuel cell without a separate air pump or fan, thereby ensuring smooth chemical reaction of the fuel cell. Also, the electronic apparatus of the invention supplies hot air to the fuel cell, thereby achieving a less noise-making and more compact product greatly improved in capability of the fuel cell.

In addition, in the electronic apparatus of the invention, the body and fuel cell are more easily detachable and thus use-friendly. Also, according to the invention, dust or other impurities advantageously do not enter inside the body when the fuel cell is separated.

While the present invention has been shown and described in connection with the preferred embodiments, it will be apparent to those skilled in the art that modifications and variations can be made without departing from the spirit and scope of the invention as defined by the appended claims.

What is claimed is:

1. An electronic apparatus having a fuel cell comprising:
   a cooling fan to cool heat-generating parts of the electronic apparatus having the fuel cell mounted thereon;
   a guide bracket to guide wind of the cooling fan, upon having cooled the heat-generating parts, toward a fuel cell;
   a body housing to house the cooling fan and the first guide bracket therein, the body housing having a first through hole disposed in a portion of the body housing corresponding to the exhaust hole of the first guide bracket which exhausts the wind of the cooling fan; and
   a fuel cell housing to house the fuel cell and the second guide bracket therein, the fuel cell housing having a second through hole disposed in a portion of the fuel cell housing corresponding to the intake hole which takes in the wind exhausted from the exhaust hole,
   wherein the guide bracket comprises
      a first guide bracket having an exhaust hole, the first guide bracket guiding the wind of the cooling fan, upon having cooled the heat-generating parts, to be exhausted toward the exhaust hole, and
      a second guide bracket having an intake hole, the second guide bracket receiving the wind exhausted from the exhaust hole through the intake hole to guide toward the fuel cell,
   wherein the body housing and the fuel cell housing are detachably combined,
   wherein the second guide bracket is combined such that the intake hole is protruded outside to be inserted into the body housing through the first through hole, and
   wherein the body housing further comprises a blocking plate to open and close the first through hole.

2. The electronic apparatus according to claim 1, wherein the blocking plate is hinged inside the body housing, the blocking plate being pushed by the intake hole inserted into the body housing to open the first through hole.

3. The electronic apparatus according to claim 2, wherein the first through hole further comprises elastic means to apply an elastic force to the first through hole so that the blocking plate covers the first through hole.

4. The electronic apparatus according to claim 2, wherein the body housing has at least one air outlet formed therein so that air exhausted from the first guide bracket is released outside, and wherein the blocking plate blocks the air outlet when the first through hole is open.

5. The electronic apparatus according to claim 3, wherein the body housing has at least one air outlet formed therein so that air exhausted from the first guide bracket is released outside, and wherein the blocking plate blocks the air outlet when the first through hole is open.

6. The electronic apparatus according to claim 1, wherein the body housing has at least one air outlet formed therein so that air exhausted from the first guide bracket is released outside, and wherein the blocking plate blocks the air outlet when the first through hole is open.

7. An electronic apparatus having a fuel cell comprising:

a cooling fan to cool heat-generating parts of the electronic apparatus having the fuel cell mounted thereon;

a guide bracket to guide wind of the cooling fan, upon having cooled the heat-generating parts, toward a fuel cell, wherein the electronic apparatus does not have any additional supplying unit to supply wind to the fuel cell except the cooling fan directed to the heat-generating parts, and wherein the guide bracket comprises a first guide bracket having an exhaust hole, the first guide bracket guiding the wind of the cooling fan, upon having cooled the heat-generating parts, to be exhausted toward the exhaust hole, and a second guide bracket having an intake hole, the second guide bracket receiving the wind exhausted from the exhaust hole through the intake hole to guide toward the fuel cell;

a body housing to house the cooling fan and the first guide bracket therein, the body housing having a first through hole disposed in a portion of the body housing corresponding to the exhaust hole of the first guide bracket which exhausts the wind of the cooling fan; and a fuel cell housing to house the fuel cell and the second guide bracket therein, the fuel cell housing having a second through hole disposed in a portion of the fuel cell housing corresponding to the intake hole which takes in the wind exhausted from the exhaust hole, wherein the body housing and the fuel cell housing are detachably combined, wherein the second guide bracket is combined such that the intake hole is protruded outside to be inserted into the body housing through the first through hole, and wherein the body housing further comprises a blocking plate to open and close the first through hole.

8. The electronic apparatus according to claim 7, wherein the blocking plate is hinged inside the body housing, the blocking plate being pushed by the intake hole inserted into the body housing to open the first through hole.

9. The electronic apparatus according to claim 8, wherein the first through hole further comprises elastic means to apply an elastic force to the first through hole so that the blocking plate covers the first through hole.

10. The electronic apparatus according to claim 7, wherein the body housing has at least one air outlet formed therein so that air exhausted from the first guide bracket is released outside, and wherein the blocking plate blocks the air outlet when the first through hole is open.

11. The electronic apparatus according to claim 8, wherein the body housing has at least one air outlet formed therein so that air exhausted from the first guide bracket is released outside, and wherein the blocking plate blocks the air outlet when the first through hole is open.

12. The electronic apparatus according to claim 9, wherein the body housing has at least one air outlet formed therein so that air exhausted from the first guide bracket is released outside, and wherein the blocking plate blocks the air outlet when the first through hole is open.

* * * * *